Nov. 26, 1929.  P. H. HUTCHINSON  1,736,972
SPINDLE MOUNTING
Filed March 14, 1924
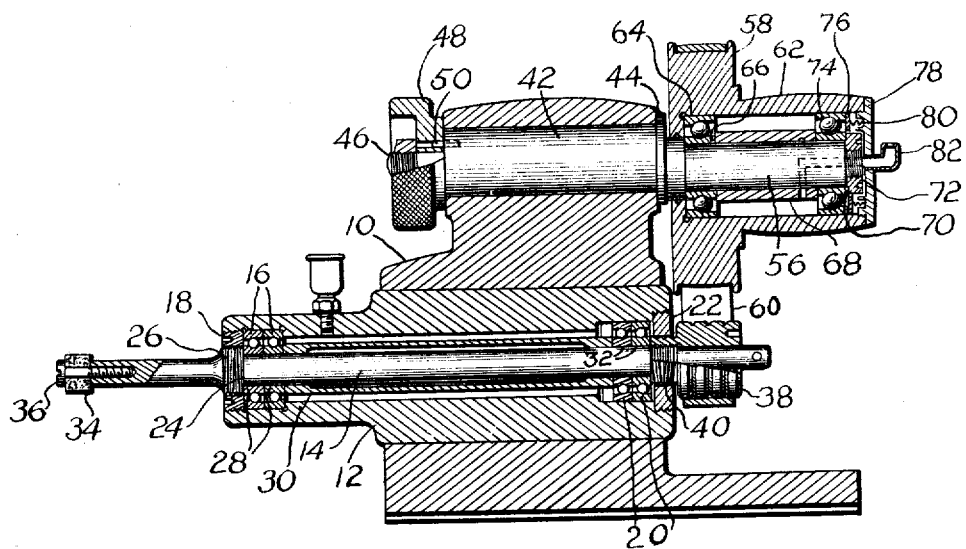
Fig.1.
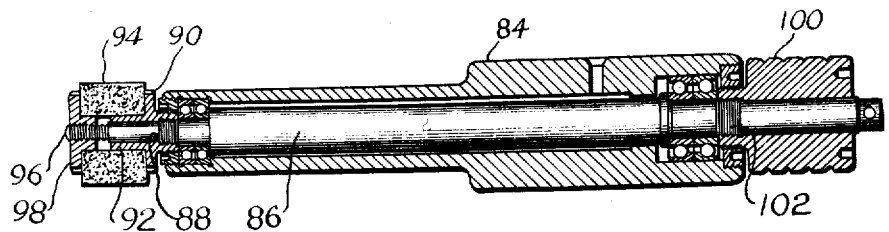
Fig.2.
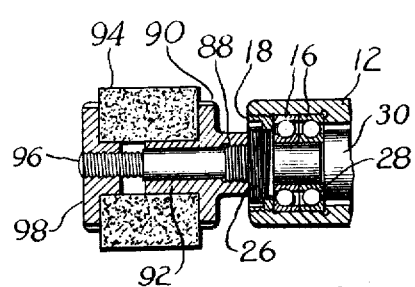
Fig.3.
Fig.4.
INVENTOR:
PHILLIP H. HUTCHINSON,
BY
his ATTORNEY.

Patented Nov. 26, 1929

1,736,972

UNITED STATES PATENT OFFICE

PHILIP H. HUTCHINSON, OF EAST ORANGE, NEW JERSEY, ASSIGNOR TO GENERAL MOTORS CORPORATION, OF DETROIT, MICHIGAN, A CORPORATION OF DELAWARE

SPINDLE MOUNTING

Application filed March 14, 1924. Serial No. 699,370.

This invention relates to spindle mountings and is herein shown as embodied in a ball bearing mounting and driving means for the spindle of an internal grinding machine.

Grinding spindles for accurately finishing the interior of race rings and other hollow articles must run true, without chattering or vibration, and the pressure of the grinding wheel against the work and the pull of the belt drive must cause no distortion. A spindle with plain bearings will not run true, due to the necessity for some space for an oil film which prevents accurate centering. When a long belt from an ordinary counter-shaft pulley is belted directly to the spindle pulley and driven at high speed, the pull is not uniform and vibration results from lack of alignment between the two shafts. An object of the invention, therefore, is to provide a mounting and a driving mechanism for grinding spindles which will efficiently meet the above and other requirements.

Ball bearings have heretofore been tried for grinding spindles but they must be carefully selected and precisely and accurately adjusted and any disturbance of the adjustment causes rapid wear. Another object of the invention is to provide a ball bearing spindle which can be removed from its bearings without disturbing the adjustment of the latter. Another object is to provide an improved fastening for the belt pulley and grinding wheel.

To these ends and also to improve generally upon devices of the character indicated my invention consists in the various matters hereinafter described and claimed.

Referring to the drawings, Figure 1 is a vertical section through a grinding spindle and its driving means.

Figure 2 is a vertical section of a modification.

Figure 3 is a section of the wheel securing means of Figure 2 applied to the spindle mounting of Figure 1 and Figure 4 is a side view of a portion of Figure 1.

The numeral 10 indicates a holder or head which detachably receives a quill or housing 12 through which extends a spindle 14, the latter being spaced from the housing and journalled in ball bearings therein. Fixed against a shoulder formed by an enlargement near one end of the housing are outer bearing rings 16 of a ball bearing, the rings having their thrust faces on the outside of the balls and being held fixedly in position by a nut 18 threaded in the housing. Near the other end of the housing are outer bearing rings 20 which have their thrust faces between the balls and are arranged to slide axially in an annular recess or enlargement of the bore of the housing. The recess is closed by a dust cap 22 threaded in the housing. Near one end of the housing the spindle has an enlarged portion forming a shoulder 24, the enlarged portion being provided with right and left hand threads 26 fitting a smooth bore in the nut 18 and acting to exclude dust and grit and to retain lubricant in the bearing.

Inner bearing rings 28 are fitted to the spindle and one of them abuts against the shoulder 24. A spacing sleeve 30, recessed on the inside, spaces the inner bearing rings 28 from another set of inner bearing rings 32. The spindle 14 is prolonged beyond the housing at one end and carries a suitable tool, herein shown as a grinding wheel 34 fastened to the spindle by a screw 36. At the other end of the spindle is a small pulley 38 having an extension threaded on the spindle and abutting against the inner bearing rings 32 to clamp them against the sleeve 30 and the sleeve and inner bearing rings 28 against the shoulder 24. Right and left threads 40 fitting a smooth bore in cap 22 exclude grit. By unscrewing the pulley 38, the spindle 14 with its tool can be removed without in any way disturbing the adjustment of the bearings, the nut 18 and the balls in the left hand bearing holding the inner rings and the sleeve in place.

Adjustably fixed in the upper portion of the holder 10 is a shaft 42, the shaft having a collar 44 bearing against one side of the holder and having at its other end a reduced portion 46 receiving a knurled collar 48 fastened in place by a nut threaded on the shaft. A pin 50 locks the knurled collar against turning on the shaft. As shown in Figure 4, the holder is split as at 52 to clamp the shaft 42, there being a stud 54 fixed to one portion of the holder and extending upwardly through the other portion where it is threaded to receive a clamping nut. The shaft 42 has an eccentric portion 56 arranged parallel to the grinding spindle and surrounding this eccentric portion and mounted on ball bearings is a comparatively large pulley 58 connected by a belt 60 to the smaller pulley 38. An extension 62 of smaller diameter than the pulley part 58 receives the belt from any suitable belt drive. It will be noted that the belt 60 can be tightened even while the grinder is running by loosening the clamping nut on the stud 54 and turning the shaft 42 by means of the knurled collar 48 after which the eccentric portion 56 of the shaft is fixed in its new position.

Resting against a shoulder in the interior of the pulley is an outer bearing ring 64 of the angular contact type, the balls cooperating with an inner bearing ring 66 resting against a shoulder on the eccentric portion of the shaft. A spacing sleeve 68 is placed between the inner race ring 66 and a second inner race ring 70 which is held on the eccentric portion of the shaft by a nut 72. Slidably mounted in the pulley is an outer race ring 74 having its thrust face outside of the balls and a washer 76 engaging the outer side of the race ring serves as an abutment for springs 80 which are received in recesses in a cap 78 threaded in the pulley. An oil well 82 leading through the cap 78 conducts oil through the shaft to the interior of the pulley and bearings. The springs 80 serve to automatically take up any wear in the pulley bearing and prevent play by pressing the outer race ring at one end of the pulley towards the cooperating angular contact bearing at the other end of the pulley. The ball bearing mountings which insure the rotation of the pulley and spindle on parallel axes reduce strain on the spindle and prevent chattering.

In Figure 2 there is shown a housing 84 with a spindle passing therethrough, the spindle having a mounting similar to the mounting of Figure 1, except that the spindle has an enlarged portion 86 in place of a sleeve to space the inner bearing rings from one another. The spindle has a reduced threaded portion at 88 and an inner clamping plate 90 is threaded thereon and has a smooth cylindrical portion 92 entering an opening in a grinding wheel 94. The spindle has a further reduced portion which is threaded as at 96 to receive an outer clamping plate 98 for securing the grinding wheel. The pulley 100 at the other end of the spindle has a reduced threaded portion as before, engaging threads 102 on the spindle. The threads 88 and 96 on the clamping plates and the threads 102 of the pulley extend in opposite directions so that the reaction of the grinding wheel against the work and the pull of the belt will tend to tighten both threaded members. The threads 88 and 102 are of smaller pitch than the threads 96 so that a differential effect is obtained which tends to tighten the clamping plates against the grinding wheel. In Figure 3 the same clamping means is shown applied to the spindle mounting of Figure 1 and corresponding parts are indicated by the same reference numerals that are used in Figures 1 and 2.

Although the invention has been described by reference to a specific construction, it should be understood that, in its broader aspects, the invention is not necessarily limited to the precise construction selected for illustrative purposes.

I claim:

1. In a spindle mounting for high speed tools, a head having an opening for detachably receiving a quill or housing, the housing having a bore with enlargements at the ends, outer bearing rings in each enlargement, rolling elements for each set of rings, a nut threaded in one end of the housing for clamping one set of rings against a shoulder formed by the enlargement, the other set of bearing rings being slidable in the other enlargement and having thrust faces between the rolling elements to insure simultaneous sliding movement, a spindle extending through the housing and having an enlargement forming a shoulder, the enlargement having right and left threads fitting a smooth bore in the nut to retain lubricant and exclude foreign matter, a tool on the end of the spindle, inner bearing rings fitting the spindle at the shoulder, inner bearings fitting the spindle near the other end of the latter, a spacing sleeve on the spindle between the inner sets of bearing rings, a driving member having an extension threaded on one end of the spindle next to the adjacent inner bearing rings to clamp the sets of inner bearing rings and the sleeve as a unit against the spindle shoulder, a cap closing the end of the housing and having a smooth bore, the extension of the driving member having right and left threads fitting in the bore of the cap, the removal of the driving member alone enabling the spindle to be slid out of the housing without disturbing the bearings; substantially as described.

2. In a spindle mounting for high speed tools, a head having an opening for detachably receiving a quill or housing, the housing having a bore with enlargements at the ends, a set of outer bearing rings in each enlargement, rolling elements for each set of rings, a nut threaded in one end of the housing for clamping one set of rings against a shoulder formed by the enlargement, the other set of rings being slidable in the other enlargement, a spindle extending through the housing and having an enlargement near one end forming a shoulder, a tool on the end of the spindle, a set of inner bearing rings fitting the spindle at the shoulder, means carried by the spindle for making a close joint with a bore in the clamping nut, a second set in inner bearing rings fitting the spindle near an end of the latter, a driving pulley having an extension threaded on said end of the spindle for clamping the adjacent bearing rings, and a cap closing the end of the housing and having a smooth bore, the extension of the pulley having right and left threads fitting in the bore of the cap; substantially as described.

In testimony whereof I hereunto affix my signature.

PHILIP H. HUTCHINSON.

CERTIFICATE OF CORRECTION.

Patent No. 1,736,972.  Granted November 26, 1929, to

PHILIP H. HUTCHINSON.

It is hereby certified that error appears in the printed specification of the above numbered patent requiring correction as follows: Page 2, line 103, claim 1, for the word "bearings" read "bearing rings"; page 3, line 5, claim 2, for the word "of" read "in"; and that the said Letters Patent should be read with these corrections therein that the same may conform to the record of the case in the Patent Office.

Signed and sealed this 24th day of December, A. D. 1929.

(Seal)

M. J. Moore,
Acting Commissioner of Patents.

CERTIFICATE OF CORRECTION.

Patent No. 1,736,972.  Granted November 26, 1929, to

PHILIP H. HUTCHINSON.

It is hereby certified that Certificate of Correction issued December 24, 1929, was erroneously drawn as to the correction in claim 2, and that this Certificate should have read as follows: Page 3, line 5, claim 2, for the word "in" read "of"; that the said Certificate may conform to the record of the case in the Patent Office.

Signed and sealed this 14th day of January, A. D. 1930.

(Seal)

M. J. Moore,
Acting Commissioner of Patents.

a shoulder, a tool on the end of the spindle, a set of inner bearing rings fitting the spindle at the shoulder, means carried by the spindle for making a close joint with a bore in the clamping nut, a second set in inner bearing rings fitting the spindle near an end of the latter, a driving pulley having an extension threaded on said end of the spindle for clamping the adjacent bearing rings, and a cap closing the end of the housing and having a smooth bore, the extension of the pulley having right and left threads fitting in the bore of the cap; substantially as described.

In testimony whereof I hereunto affix my signature.

PHILIP H. HUTCHINSON.

CERTIFICATE OF CORRECTION.

Patent No. 1,736,972.  Granted November 26, 1929, to

PHILIP H. HUTCHINSON.

It is hereby certified that error appears in the printed specification of the above numbered patent requiring correction as follows: Page 2, line 103, claim 1, for the word "bearings" read "bearing rings"; page 3, line 5, claim 2, for the word "of" read "in"; and that the said Letters Patent should be read with these corrections therein that the same may conform to the record of the case in the Patent Office.

Signed and sealed this 24th day of December, A. D. 1929.

M. J. Moore,
Acting Commissioner of Patents.

(Seal)

CERTIFICATE OF CORRECTION.

Patent No. 1,736,972.  Granted November 26, 1929, to

PHILIP H. HUTCHINSON.

It is hereby certified that Certificate of Correction issued December 24, 1929, was erroneously drawn as to the correction in claim 2, and that this Certificate should have read as follows: Page 3, line 5, claim 2, for the word "in" read "of"; that the said Certificate may conform to the record of the case in the Patent Office.

Signed and sealed this 14th day of January, A. D. 1930.

M. J. Moore,
Acting Commissioner of Patents.

(Seal)

CERTIFICATE OF CORRECTION.

Patent No. 1,736,972.

Granted November 26, 1929, to

PHILIP H. HUTCHINSON.

It is hereby certified that Certificate of Correction issued December 24, 1929, was erroneously drawn as to the correction in claim 2, and that this Certificate should have read as follows: Page 3, line 5, claim 2, for the word "in" read "of"; that the said Certificate may conform to the record of the case in the Patent Office.

Signed and sealed this 14th day of January, A. D. 1930.

(Seal)

M. J. Moore,
Acting Commissioner of Patents.